US012212060B2

(12) United States Patent
Chang et al.

(10) Patent No.: US 12,212,060 B2
(45) Date of Patent: Jan. 28, 2025

(54) ELECTRONIC DEVICE AND ANTENNA MODULE

(71) Applicant: WISTRON NEWEB CORPORATION, Hsinchu (TW)

(72) Inventors: Hsuan-Jui Chang, Hsinchu (TW); Hsieh-Chih Lin, Hsinchu (TW); Guan-Ren Su, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 300 days.

(21) Appl. No.: 17/817,406

(22) Filed: Aug. 4, 2022

(65) Prior Publication Data

US 2023/0117264 A1 Apr. 20, 2023

(30) Foreign Application Priority Data

Oct. 15, 2021 (TW) ................................ 110138286

(51) Int. Cl.
*H01Q 1/22* (2006.01)
*H01Q 5/378* (2015.01)
*H01Q 13/16* (2006.01)

(52) U.S. Cl.
CPC ........... *H01Q 13/16* (2013.01); *H01Q 1/2266* (2013.01); *H01Q 5/378* (2015.01)

(58) Field of Classification Search
CPC ....... H01Q 13/16; H01Q 1/2266; H01Q 5/378
See application file for complete search history.

(56) References Cited

U.S. PATENT DOCUMENTS

2013/0113671 A1 5/2013 Su et al.
2014/0266938 A1* 9/2014 Ouyang ................. H01Q 5/321 343/729
2015/0236426 A1* 8/2015 Zhu ........................ H01Q 13/10 343/702
2015/0270619 A1* 9/2015 Zhu ...................... H01Q 1/2266 343/702
2015/0311594 A1* 10/2015 Zhu ........................ H01Q 21/28 343/702
2017/0005414 A1 1/2017 Yang
(Continued)

FOREIGN PATENT DOCUMENTS

TW 201320468 A1 5/2013
TW 201703350 A 1/2017
WO WO-2019049877 A1 * 3/2019 ........... H01Q 1/3275

*Primary Examiner* — Seokjin Kim
(74) *Attorney, Agent, or Firm* — McClure, Qualey & Rodack, LLP

(57) ABSTRACT

An electronic device and an antenna module are provided. The electronic device includes a metal housing with a slot having an open end and a first upper edge portion located at an upper edge of the slot. The antenna module is arranged in the metal housing and includes a carrier board, a feeding element, a radiating element with a feeding portion connected to the feeding element, and a first parasitic radiating element arranged on the carrier board and connected or coupled to the first upper edge portion. A vertical projection of the radiating element on the metal housing at least partially overlaps the slot. One side of the first parasitic radiating element is near an edge of the open end. The radiating element is fed with a signal through the feeding element to generate a resonant mode and is coupled to the slot to excite another resonant mode.

17 Claims, 5 Drawing Sheets

(56) References Cited

U.S. PATENT DOCUMENTS

| | | | | |
|---|---|---|---|---|
| 2020/0185813 | A1* | 6/2020 | Chang | H01Q 1/48 |
| 2020/0295445 | A1* | 9/2020 | Tseng | H01Q 5/378 |
| 2021/0367321 | A1* | 11/2021 | Hung | H01Q 5/385 |

* cited by examiner

ELECTRONIC DEVICE AND ANTENNA MODULE

CROSS-REFERENCE TO RELATED PATENT APPLICATION

This application claims the benefit of priority to Taiwan Patent Application No. 110138286, filed on Oct. 15, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device and an antenna module, and more particularly to an electronic device and an antenna module without antenna clearance.

BACKGROUND OF THE DISCLOSURE

With the rapid advancement in technology, consumers have higher expectations for electronic devices like notebook computers. The electronic devices are not only designed to be thinner and lighter, they are also designed to use metal housing for enforcing the structural strength.

Moreover, in order to satisfy consumer's need to use the electronic device anywhere, any time, the electronic device is usually implemented with a multi-input and multi-output (MIMO) antenna system, which means multiple antennas are placed in limited space inside the electronic device for operating at difference broadband frequencies, such as LTE or WLAN. In general, antenna clearance is arranged around the antenna system, in other words, no metal is allowed around the antenna system. However, manufacturing cost would increase, and there would be a conflict with the metal housing design which is used to enforce structural strength and to meet the thin and light requirement.

In view of overcoming the above deficiencies, how to improve the structural design so as to provide an antenna design with zero clearance and in integrated with the bezel of metal housing has become an important issue to be solved in this field.

SUMMARY OF THE DISCLOSURE

In response to the above-referenced technical inadequacies, the present disclosure provides an electronic device and an antenna module.

In one aspect, the present disclosure provides an electronic device that includes a metal housing, a carrier board, a feeding element, a radiating element, and a first parasitic radiating element. The metal housing has a slot and a first upper edge portion. The slot has an open end, and the first upper edge portion is located at an upper edge above where the slot is positioned in the metal housing. The carrier board is disposed in the metal housing. The radiating element is disposed on the carrier board, and a vertical projection of the radiating element on the metal housing at least partially overlaps the slot. The radiating element includes a feeding portion that is connected to the feeding element. The first parasitic radiating element is disposed on the carrier board and is connected or coupled to the first upper edge portion, and one side of the first parasitic radiating element is close to an edge of the open end. The radiating element is fed with a signal to generate at least one resonant mode, and the radiating element is coupled to the slot to least excite at least another resonant mode.

In another aspect, the present disclosure provides an antenna module disposed in a metal housing. The metal housing has a slot with an open end and a first closed end. The metal housing includes a first upper edge portion and a second upper edge portion, and the first upper edge portion and the second upper edge portion are disposed at an upper edge above where the slot is positioned in the metal housing and are disposed respectively at two sides of the open end. The first upper edge portion is located between the open end and the first closed end. The antenna module includes a carrier board, a feeding element, a radiating element, and a first parasitic radiating element. The radiating element is disposed on the carrier board and includes a feeding portion connected to the feeding element. A vertical projection of the radiating element on the metal housing at least partially overlaps the slot. The first parasitic radiating element is disposed on the carrier board and is connected or coupled to the first upper edge portion. One side of the first parasitic radiating element is close to an edge of the open end. The radiating element is fed with a signal through the feeding element to generate at least one resonant mode, and the radiating element is coupled to the slot to excite at least another resonant mode.

Therefore, in the electronic device and the antenna module provided by the present disclosure, by virtue of the first parasitic radiating element being arranged on the carrier board, the first parasitic radiating element being connected or coupled to the first upper edge portion, and one side of the first parasitic radiating element being close to the edge of the open end, the first parasitic radiating element is used to increase the upper edge area of the slot antenna, and so the radiation characteristic of the antenna module is improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
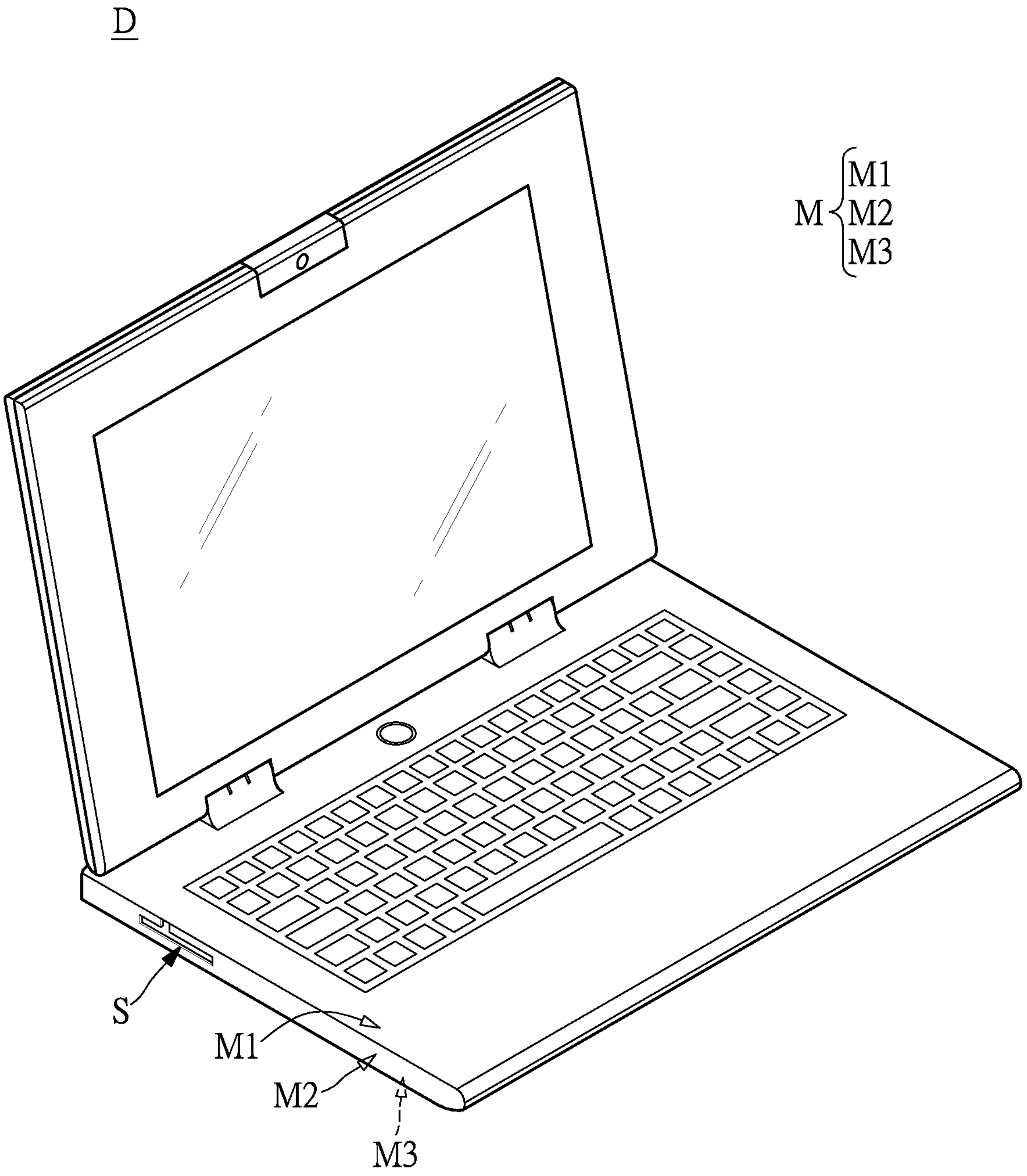
FIG. 1 is a schematic perspective view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In addition, the term "or", as used herein, should include any one or a combination of the associated enlisted items, as the case may be. The term "connect" in the context of the present disclosure means there is a physical connection between two elements and is directly or indirectly connected. The term "couple" in the context of the present disclosure means there is no physical connection between two separated elements, and the two elements are instead connected by their electric field energy where the electric field energy generated by the current of one element excites the electric field energy of the other element.

First Embodiment

Referring to FIG. 1, the present disclosure provides an electronic device D, and the electronic device is, for example but not limited to, a notebook computer. The electronic device D includes a metal housing M and an antenna module A, and the antenna module A is arranged in the metal housing M. The metal housing M is provided with a slot S, and the slot S is located at a side bezel of the electronic device D as shown in FIG. 1. More specifically, the metal housing M has a first side M1, a second side M2, and a third side M3, and the slot S is provided on the second side M2.

Figure 2:
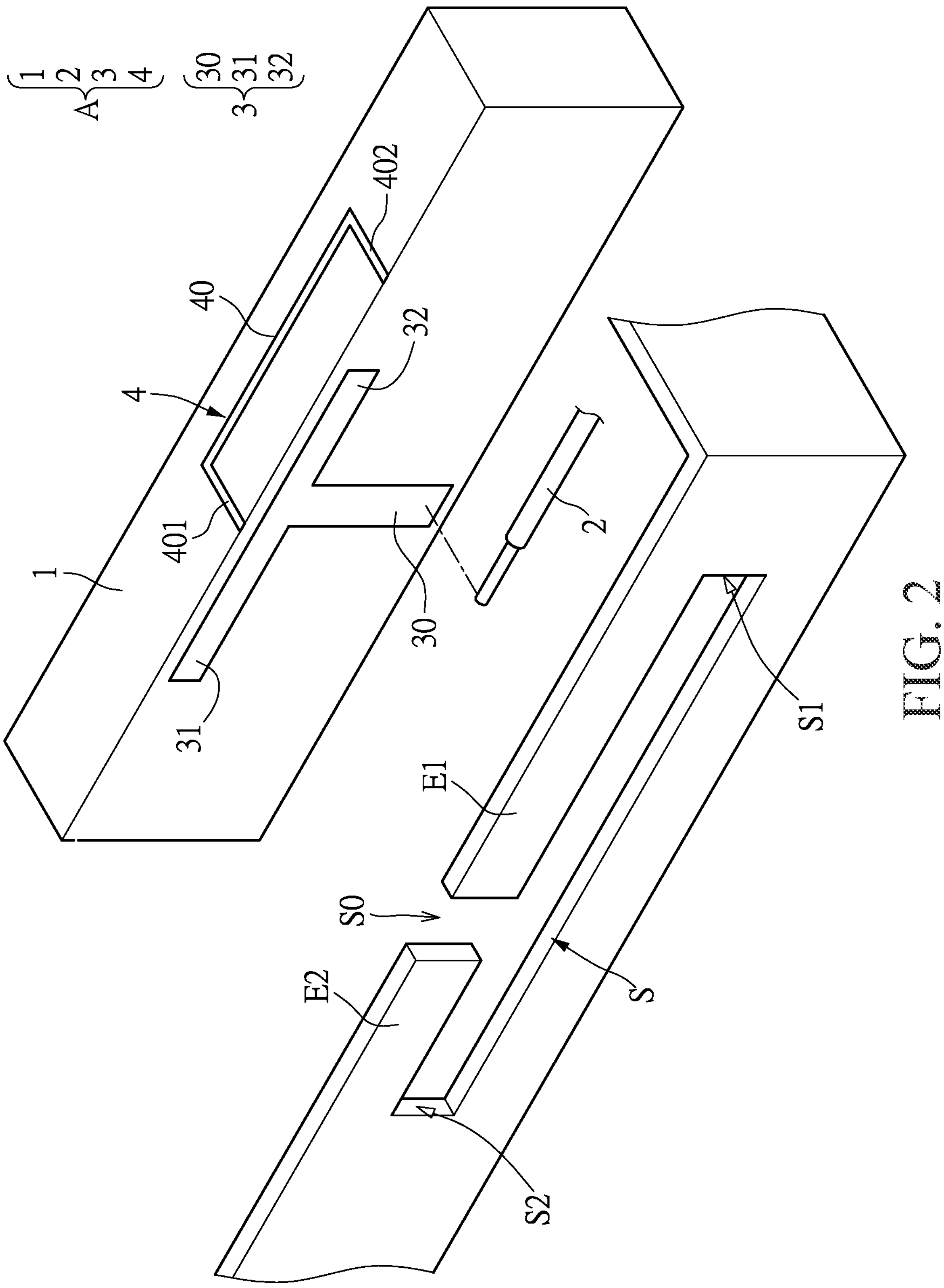
FIG. 2 is an schematic exploded view of an antenna module and a metal housing according to a first embodiment of the present disclosure.
Figure 3:
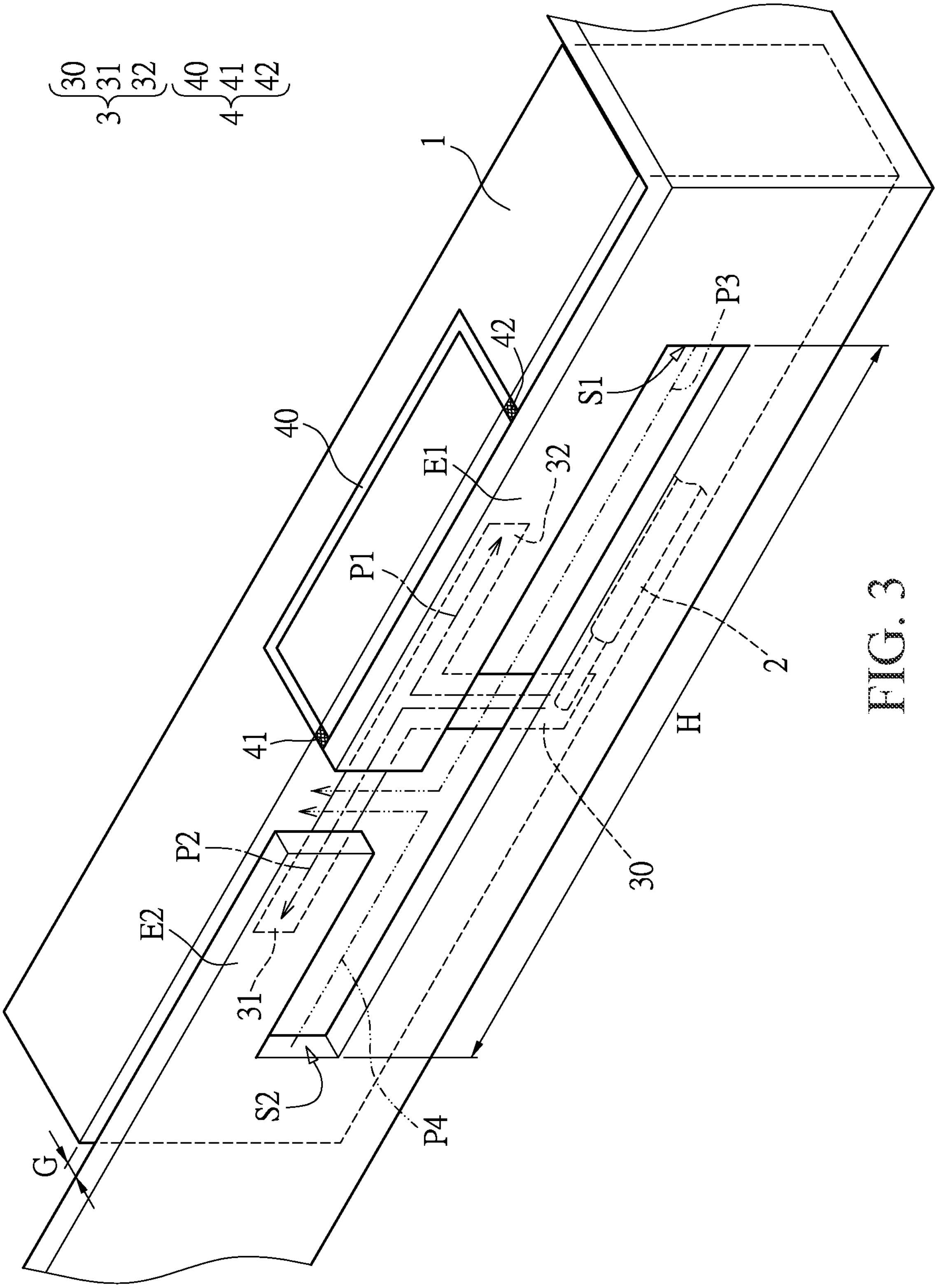
FIG. 3 is a schematic view of the antenna module and the metal housing according to the first embodiment of the present disclosure.

Referring to FIG. 2 and FIG. 3, which are enlarged views of the slot S part in FIG. 1 to show the relative positioning of the slot S and the antenna module A in a first embodiment, the slot S has an inverted T-shape, which includes an open end S0, a first closed end S1, and a second closed end S2. The open end S0 is located between the first closed end S1 and the second closed end S2 and faces toward a top cover of the electronic device D. In other words, the open end S0 faces the first side M1 as shown in FIG. 1. There is a set distance H between the first closed end S1 and the second closed end S2. The metal housing M includes a first upper edge portion E1, and the first upper edge portion E1 is a part of the second side M2 of the metal housing M. The specific location of the first upper edge portion E1 is at the upper edge of where the slot is opened/provided in the metal housing M. More specifically, the first upper edge portion E1 is located between the open end S0 and the first closed end S1.

The antenna module A includes a carrier board 1, a feeding element 2, a radiating element 3, and a first parasitic radiating element 4. The carrier board 1 is arranged in the metal housing M. The radiating element 3 is arranged on the carrier board 1, and a vertical projection of the radiating element 3 on the metal housing M at least partially overlaps the slot S. The first parasitic radiating element 4 is arranged on the carrier board 1. The radiating element 3 includes a feeding portion 30, and the feeding portion 30 is connected to the feeding element 2. The radiating element 3 is therefore fed with a signal through the feeding element 2 to generate a resonant mode, and the radiating element is further coupled to the slot S to excite another resonant mode. The carrier board 1 in this embodiment, as shown in FIG. 2, is a cuboid, but the present disclosure is not limited thereby. The radiating element 3 is arranged on the side surface of the carrier board 1, and the first parasitic radiating element 4 is arranged on the top surface of the carrier board 1. The side surface of the carrier board 1 faces the slot S. For example, the carrier board 1 is an FR4 substrate, the feeding element 2 is a coaxial cable, and the radiating element 3 and the first parasitic radiating element 4 can be a metal sheet, a micro strip, a metal wire, or other electrical conductive member, but the present disclosure is not limited thereby.

Referring to FIG. 1 and FIG. 3, the first side M1 has a non-metallic region, and a vertical projection of the first parasitic radiating element 4 on the first side M1 completely overlaps the non-metallic region. The slot S is provided on the second side M2, and the third side M3 has a metallic region. A vertical projection of the non-metallic region on the third side M3 completely overlaps the metallic region. Thus, the antenna module A of the present disclosure can be located in a non-clearance region, and as such the antenna module A of the present disclosure is more flexible to the requirements of surrounding environment such as housing of the electronic device D, so that there are more options when designing the appearance of the electronic device D.

Referring to FIG. 2 and FIG. 3, the radiating element 3 further includes a first radiating portion 31 and a second radiating portion 32. The feeding portion 30 is connected between the first radiating portion 31 and the second radiating portion 32. The first radiating portion 31 extends in a first direction relative to the feeding portion 30, and the second radiating portion 32 extends in a second direction relative to the feeding portion 30. The first direction and the second direction are opposite each other, which makes the radiating element 3 into a T-shape.

Moreover, the radiating element 3 is fed with a signal through the feeding element 2 to generate a first resonant mode P1 and a second resonant mode P2. The resonant path of the first resonant mode P1 is formed by the feeding portion 30 and the first radiating portion 31, and the resonant path of the second resonant mode P2 is formed by the feeding portion 30 and the second radiating portion 32. The first resonant mode P1 and the second resonant mode P2 cover an operating frequency band that ranges from 3300 MHz to 5925 MHz. In addition, the center frequency of the first resonant mode P1 is 5500 MHz, and the length of the resonant path of the first resonant mode P1 is equal to a quarter of the wavelength of the center frequency (5500 MHz) of the operating frequency band covered by the first resonant mode P1. The center frequency of the second resonant mode P2 is 4000 MHz, and the length of the resonant path of the second resonant mode P2 is equal to a quarter of the wavelength of the center frequency (4000 MHz) of the operating frequency band covered by the second resonant mode P2.

Furthermore, there is a gap G between the radiating element 3 and the first upper edge portion E1. The gap G is the shortest distance between the radiating element 3 and the inner surface of the metal housing M, and the width of the gap is preferably between 0.5 mm and 2 mm. The radiating element 3 excites the slot S through the gap G so as to form an open slot antenna structure with the slot S. In particular, the radiating element 3 is coupled to the slot S to excite a third resonant mode P3 and a fourth resonant mode P4. The resonant path of the third resonant mode P3 is formed in the slot S along the region between the open end S0 and the first closed end S1. The resonant path of the fourth resonant mode P4 is formed in the slot S along the region between the open end S0 and the second closed end S2. In other words, the resonant path of the third resonant mode P3 is the resonant path between the open end S0 and the first closed end S1, and the resonant path of the fourth resonant mode P4 is the resonant path between the open end S0 and the second closed end S2. The third resonant mode P3 and the fourth resonant mode P4 cover an operating frequency band with a frequency range between 1805 MHz and 2690 MHz. The operating frequency band of the fourth resonant mode P4 is higher than the operating frequency band of the third resonant mode P3, and thus the length of the resonant path of the third resonant mode P3 is greater than the length of the resonant path of the fourth resonant mode P4. Furthermore, the lowest frequency of the third resonant mode P3 is 1805 MHz, and the length of the resonant path of the third resonant mode P3 is equal to one quarter of the wavelength of the lowest frequency (1805 MHz) in the operating frequency band covered by the third resonant mode P3. The lowest frequency of the fourth resonant mode P4 is 2600 MHz, and the length of the resonant path of the fourth resonant mode P4 is equal to one quarter of the wavelength of the lowest frequency (2600 MHz) in the operating frequency band covered by the fourth resonant mode P4. Additionally, the set distance H between the first closed end S1 and the second closed end S2 is less than one quarter of the wavelength of the lowest frequency covered by the third resonant mode P3.

It should be noted that a vertical projection of the first radiating portion 31 on the metal housing M at least partially overlaps the open end S0 of the slot S. Thus, the operating frequency band of the fourth resonant mode P4 excited by the radiating element 3 coupling the slot S meets the range of 1805 MHz to 2690 MHz, and the fourth resonant mode P4 has a better gain.

The corresponding center frequencies of the first resonant mode P1, the second resonant mode P2, the third resonant mode P3, and the fourth resonant mode P4 can be adjusted by changing the positioning of the open end S0, the first closed end S1, and the second closed end S2, namely changing the size of the slot S, or by changing the lengths of the first radiating portion 31 and the second radiating portion 32 of the radiating element 3. Hence, through the configuration of the antenna module A and the slot S in the metal housing M, the operating frequency bands ranging from 1805 MHz to 2690 MHz and from 3300 MHz to 5925 MHz are provided to meet the broadband operating requirement of LTC and sub-6G frequencies.

As shown in FIG. 2 and FIG. 3, the first parasitic radiating element 4 includes a first body portion 40, a first connecting portion 41 connected to the first body portion 40, and a second connecting portion 42 connected to the first body portion 40. The first parasitic radiating element 4 is annular or U-shaped. The segment 401 of the first body portion 40 is connected to the first connecting portion 41, and the other segment 402 of the first body portion 40 is connected to the second connecting portion 42. The first parasitic radiating element 4 is grounded by connecting or coupling to the first upper edge portion E1 through the first connecting portion 41 and the second connecting portion 42 and forms a first enclosed region, but the present disclosure is not limited thereto. For example, the first parasitic radiating element 4 can be shaped as a whole sheet to connect or couple to the first upper edge portion E1, and so the first enclosed region is considered to be the first parasitic radiating element 4. More particularly, one side of the first parasitic radiating element 4 is close to or even aligned with the edge of the open end S0, and the first connecting portion 41 is also connected to the edge of the open end S0. As such, through the first enclosed region formed by connecting or coupling the first parasitic radiating element 4 to the first upper edge portion E1, the upper edge area of the open slot antenna structure is increased, and so the radiation characteristic of the open slot antenna structure is improved, which obtains better radiation efficiency.

Figure 5:
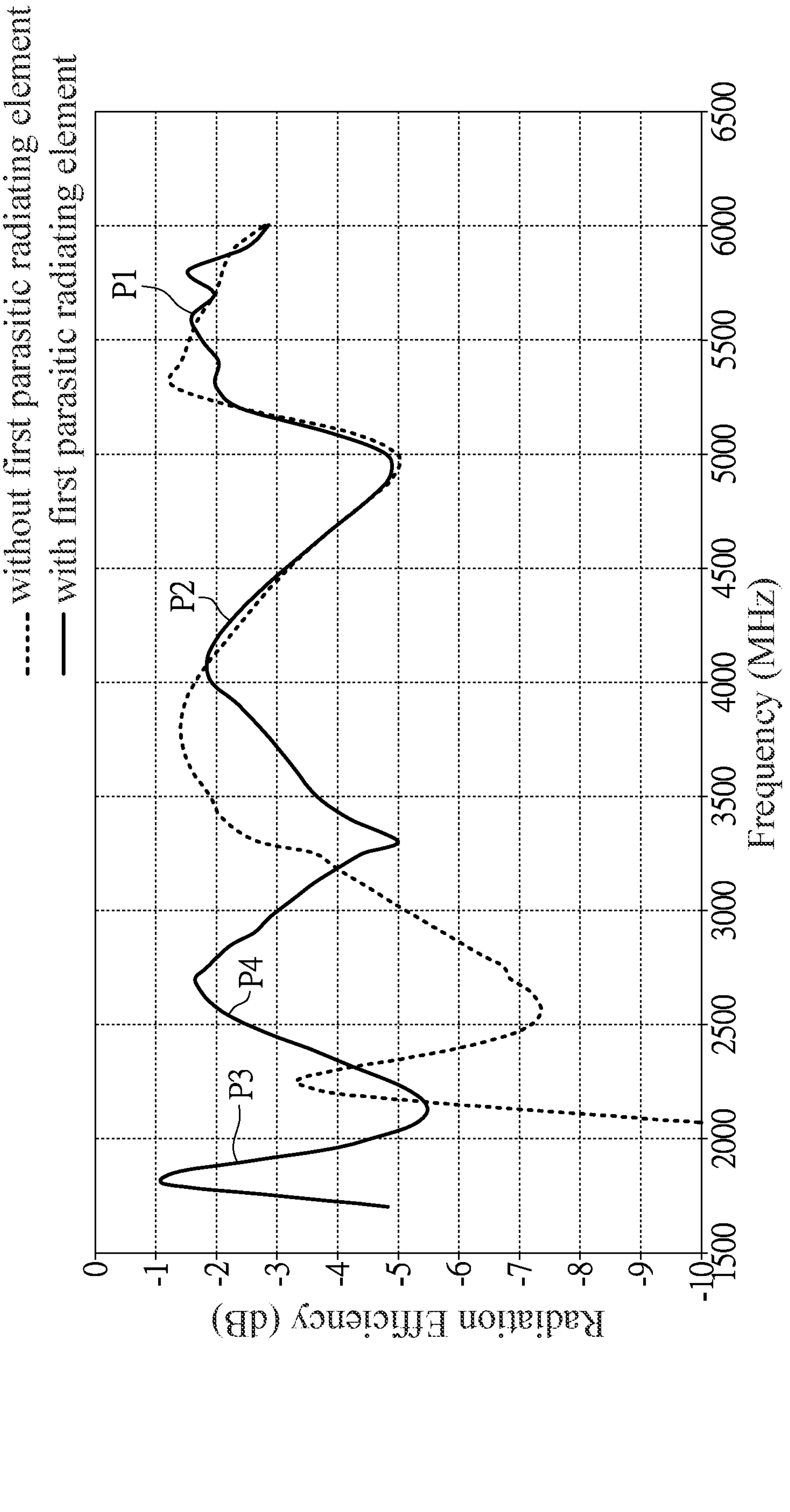
FIG. 5 is a graph illustrating radiation efficiency of the antenna module according to the first embodiment of the present disclosure.

Referring to FIG. 5, the solid line represents the state where the antenna module A of the present disclosure is provided with the first parasitic radiating element 4, and the dotted line represents the state where the antenna module A without the first parasitic radiating element 4. As shown in FIG. 5, when the antenna module A has been arranged with the first parasitic radiating portion 4, the radiation efficiencies of the four resonant modes P1~P4 generated thereby are significantly better than that of the antenna module A without the parasitic radiating element 4, and the radiation efficiency optimization is even more obvious in the third resonant mode P3 and the fourth resonant mode P4.

Referring to FIG. 3 and FIG. 5, the frequency range of the third resonant mode P3 generated by the antenna module A with the first parasitic radiating element 4 is relatively lower than the frequency range of the resonant mode generated by the antenna module A without the first parasitic radiating element 4. In other words, the present disclosure is able to adjust the frequency range of the third resonant mode P3 through the placement of the first parasitic radiating element 4, so that the frequency range of the third resonant mode P3 shifts toward lower frequency, and in turn the size of the slot S can be reduced. Therefore, by placing the first parasitic radiating element 4, the set distance H between the first closed end S1 and the second closed end S2 can be less than one quarter of the wavelength of the lowest frequency (1805 MHz) covered by the third resonant mode P3.

However, the aforementioned details are disclosed for exemplary purposes only, and are not meant to limit the scope of the present disclosure.

Second Embodiment

Figure 4:
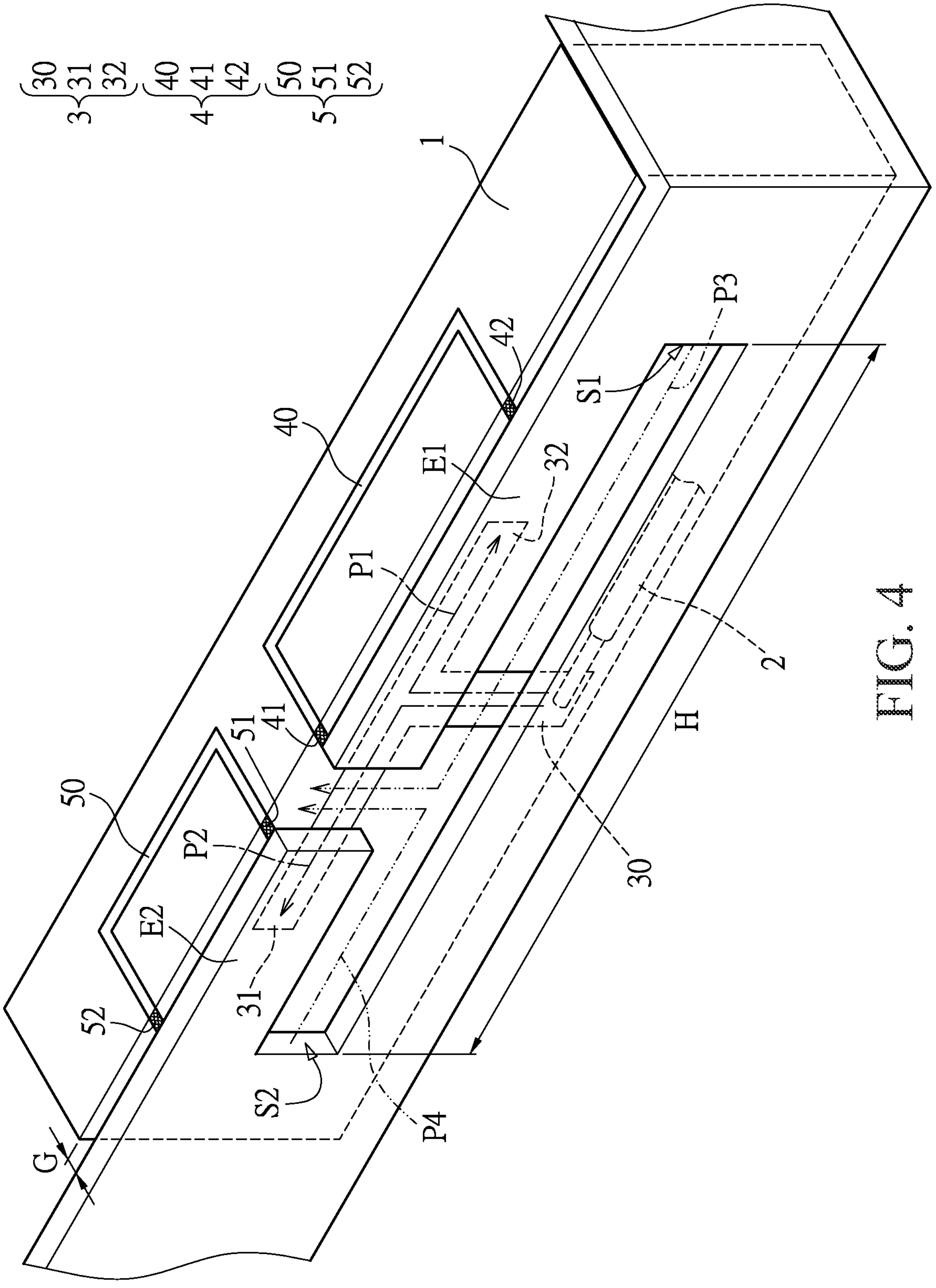
FIG. 4 is a schematic view of an antenna module and a metal housing according to a second embodiment of the present disclosure.

Referring to FIG. 4, the antenna module A in a second embodiment of the present disclosure further includes a second parasitic radiating element 5. The second parasitic radiating element 5 is arranged on the carrier board 1. The second parasitic radiating element 5 and the first parasitic radiating element 4 are respectively arranged at two sides of the open end S0, and the structure of the second parasitic radiating element 5 is similar to that of the first parasitic radiating element 4. Moreover, the vertical projection of the second parasitic radiating element 5 on the first side M1 of the metal housing M overlaps the non-metallic region. The metal housing M further includes a second upper edge portion E2, and the second upper edge portion E2 is a part of the second side M2 of the metal housing M. The second upper edge portion E2 is located at the upper edge above where the slot is positioned in the metal housing M, and in specific, the second upper edge portion E2 is located between the open end S0 and the second closed end S2. The second upper edge portion E2 and the first upper edge portion E1 are respectively arranged at two sides of the open end S0. The second parasitic radiating element 5 includes a second body portion 50, a third connecting portion 51, and a fourth connecting portion 52, and the third connecting portion 51 and the fourth connecting portion 52 are respectively connected to two ends of the second body portion 50. The second parasitic radiating element 5 may be U-shaped and is grounded by connecting or coupling to the second upper edge portion E2 through the third connecting portion 51 and the fourth connecting portion 52, thereby forming a second enclosed region. Alternatively, the second parasitic radiating element 5 may be shaped as a whole sheet for connecting or coupling to the second upper edge portion E2. In addition, one side of the second parasitic radiating element 5 is close to or even aligned with the edge of the open end S0, and the third connecting portion 51 is also connected to the edge of the open end S0. Equally, the present disclosure adjusts the frequency range of the fourth resonant mode P4 through the placement of the second parasitic radiating element 5, so as to shift the frequency range of the fourth resonant mode P4 toward lower frequency range, and thereby achieving size reduction of the slot S.

It is to be noted that even though the present disclosure is able to achieve the slot S size reduction by adjusting the frequency range of the third resonant mode P3 or the fourth resonant mode P4 to shift toward lower frequency through the placement of the parasitic radiating element on the first upper edge portion E1 or the second upper edge portion E2, placing the parasitic radiating element on the first upper edge portion E1 would be more optimal in reducing the slot S size than placing the parasitic radiating element on the second upper edge portion E2. As shown in FIG. 4, because the length of the resonant path of the third resonant mode P3 is relatively longer than the length of the resonant path of the fourth resonant mode P4 due to the operating frequency band of the fourth resonant mode P4 is higher than the operating frequency band of the third resonant mode P3, the length of the first upper edge portion E1 between the open end S0 and the first closed end S1 is greater than the length of the second upper edge portion between the open end S0 and the second closed end S2. Therefore, when the parasitic radiating element is placed on the first upper edge portion E1, the length of the slot S between the open end S0 and the first closed end S1 is dramatically reduced, and thereby achieving a better effect in the size reduction of the slot S.

Beneficial Effects of the Embodiments

In conclusion, by placing the first parasitic radiating element 4 on the carrier board 1 with one side of the first parasitic radiating element 4 close to the open end S0 and connecting or coupling the first parasitic radiating element 4 to the first upper edge portion E1, the electronic device D and the antenna module A provided by the present disclosure are able to utilize the parasitic radiating element 4 to increase the upper edge area of the open slot antenna structure so that the radiation characteristic of the antenna module A is improved to obtain better radiation efficiency.

Furthermore, because the slot S is provided on the side bezel, namely the second side M2, of the metal housing M in the present disclosure, the area of the upper edge of the slot S can only include the area of the first upper edge portion E1 and the second upper edge portion E2 in this configuration, which is less than half of the second side M2. However, the lower edge area of the slot S includes the remaining area of the second side M2 area less the slot S area and plus the bottom side area, namely the area of the third side M3 with the metallic region. In other words, the difference between the upper edge area and the lower edge area of the slot S is so great that the radiation characteristic of the open slot antenna structure would be poor. Hence, through the placement of the first parasitic radiating element 4, and also the placement of the second parasitic radiating element 5, the upper edge area of the open slot antenna structure is increased with the region enclosed by the first parasitic radiating element 4 and the second parasitic radiating element 5. Hence, the radiation characteristic of the open slot antenna structure is improved, and better radiation efficiency is obtained.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application, so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a metal housing, comprising a slot and a first upper edge portion, wherein the slot comprises an open end, and the first upper edge portion is located at an upper edge above where the slot is positioned in the metal housing;

a carrier board, disposed in the metal housing;

a feeding element;

a radiating element, disposed on the carrier board and comprising a feeding portion connected to the feeding element, wherein a vertical projection of the radiating element on the metal housing at least partially overlaps the slot; and a first parasitic radiating element, disposed on the carrier board and connected or coupled to the first upper edge portion, wherein one side of the first parasitic radiating element is closer to an edge of the open end than the other side of the first parasitic radiating element, and a vertical projection of the first parasitic radiating element onto the metal housing does not overlap the slot;

wherein the radiating element is fed with a signal through the feeding element to generate at least one resonant mode, and the radiating element is coupled to the slot to excite at least another one resonant mode.

2. The electronic device according to claim 1, wherein the radiating element further comprises a first radiating portion and a second radiating portion, the feeding portion is connected between the first radiating portion and the second radiating portion, the first radiating portion extends in a first direction relative to the feeding portion, the second radiating portion extends in a second direction relative to the feeding portion, the first direction opposites the second direction, a vertical projection of the first radiating portion on the metal housing at least partially overlaps the open end of the slot.

3. The electronic device according to claim 2, wherein the radiating element is fed with the signal through the feeding element to generate a first resonant mode and a second resonant mode, a resonant path of the first resonant mode is formed by the feeding portion and the first radiating portion, and a resonant path of the second resonant mode is formed by the feeding portion and the second radiating portion.

4. The electronic device according to claim 3, wherein a length of the resonant path of the first resonant mode equals to a quarter of a wavelength of a center frequency in an operating frequency band covered by the second resonant mode.

5. The electronic device according to claim 1, wherein, there is a gap between the radiating element and the first upper edge portion, and a width of the gap is between 0.5 mm and 2 mm.

6. The electronic device according to claim 1, wherein the slot further comprises a first closed end and a second closed end, the open end is located between the first closed end and the second closed end, and the slot is T-shaped.

7. The electronic device according to claim 6, wherein the first upper edge portion is located between the open end and the first closed end, a resonant path is formed between the open end and the first closed end, another resonant path is formed between the open end and the second closed end, and a length of the resonant path between the open end and the first closed end is greater than a length of the other resonant path between the open end and the second closed end.

8. The electronic device according to claim 7, wherein the radiating element is coupled to the slot to excite a third resonant mode and a fourth resonant mode, a resonant path of the third resonant mode is the resonant path between the open end and the first closed end, and a resonant path of the fourth resonant mode is the other resonant path between the open end and the second closed end.

9. The electronic device according to claim 8, wherein a length of the resonant path of the third resonant mode is equal to a quarter of a wavelength of a lowest frequency in an operating frequency band covered by the third resonant mode, and a length of the other resonant path of the fourth resonant mode is equal to a quarter of a wavelength of a lowest frequency in an operating frequency band covered by the fourth resonant mode.

10. The electronic device according to claim 9, wherein, there is a set distance between the first closed end and the second closed end, and the set distance is less than a quarter of the wavelength of the lowest frequency covered by the third resonant mode.

11. The electronic device according to claim 1, wherein the metal housing further comprises a first side, a second side, and a third side, the slot is disposed on the second side, the first upper edge portion is located at an upper edge above where the slot is positioned on the second side, the second side is connected between the first side and the third side, the first side comprises a non-metallic region, a vertical projection of the first parasitic radiating element on the first side completely overlaps the non-metallic region, the third side comprises a metallic region, and a vertical projection of the non-metallic region on the third side completely overlaps the metallic region.

12. The electronic device according to claim 11, wherein the first parasitic radiating element comprises a first body portion, a first connecting portion, and a second connecting portion, the first connecting portion and the second connecting portion are connected to the first body portion, the first parasitic radiating element is connected or coupled to the first upper edge portion through the first connecting portion and the second connecting portion, so as to form a first enclosed region, and the first connecting portion is connected to the edge of the open end.

13. The electronic device according to claim 12, further comprising a second parasitic radiating element, disposed on the carrier board, wherein the second parasitic radiating element and the first parasitic radiating element are respectively disposed at two sides of the open end, a vertical projection of the second parasitic radiating element on the first side overlaps the non-metallic region, the metal housing further comprises a second upper edge portion, the second upper edge portion is located at the upper edge above where the slot is positioned in the metal housing, the second upper edge portion and the first upper edge portion are respectively arranged at the two sides of the open end, the second parasitic radiating element is connected or coupled to the second upper edge portion, so as to form a second enclosed region, and one side of the second parasitic radiating element is close to the edge of the open end.

14. An antenna module, disposed in a metal housing, the metal housing comprising a slot with an open end and a first closed end, a first upper edge portion between the open end and the first closed end, and a second upper edge portion, wherein the first upper edge portion and the second upper edge portion are located at an upper edge above where the slot is positioned in the metal housing and are respectively arranged at two sides of the open end, the antenna module comprising:

a carrier board;

a feeding element;

a radiating element, disposed on the carrier board and comprising a feeding portion connected to the feeding element, wherein a vertical projection of the radiating element on the metal housing at least partially overlaps the slot; and a first parasitic radiating element, disposed on the carrier board and connected or coupled to the first upper edge portion, wherein one side of the first parasitic radiating element is closer to an edge of the open end than the other side of the first parasitic radiating element, and a vertical projection of the first parasitic radiating element onto the metal housing does not overlap the slot;

wherein the radiating element is fed with a signal through the feeding element to generate at least one resonant mode, and the radiating element is coupled to the slot to excite at least another resonant mode.

15. The antenna module according to claim 14, wherein the first parasitic radiating element comprises a first body portion, a first connecting portion connected to the first body portion, and a second connecting portion connected to the first body portion, the first parasitic radiating element is connected or coupled to the first upper edge portion through the first connecting portion and the second connecting portion, so as to form a first enclosed region, and the first connecting portion is closer to the edge of the open end than the second connecting portion.

16. The antenna module of claim 14, further comprising a second parasitic radiating element, disposed on the carrier board, wherein the second parasitic radiating element and the first parasitic radiating element are respectively disposed at two sides of the open end, the second parasitic radiating element is connected or coupled to the second upper edge portion, so as to form a second enclosed region, and the second parasitic radiating element is farther from the edge of the open end than first parasitic radiating element.

17. An electronic device, comprising:

a metal housing, comprising a slot and a first upper edge portion, wherein the slot comprises an open end, and the first upper edge portion is located at an upper edge above where the slot is positioned in the metal housing;

a carrier board, disposed in the metal housing;

a feeding element;

a radiating element, disposed on the carrier board and comprising a feeding portion connected to the feeding element, a first radiating portion, and a second radiating portion, wherein the feeding portion is connected between the first radiating portion and the second radiating portion, the first radiating portion extends in a first direction relative to the feeding portion, the second radiating portion extends in a second direction relative to the feeding portion, and a vertical projection of the first radiating portion on the metal housing at least partially overlaps the open end of the slot; and a first parasitic radiating element, disposed on the carrier board and connected or coupled to the first upper edge portion, wherein one side of the first parasitic radiating element is closer to an edge of the open end than the other side of the first parasitic radiating element;

wherein the radiating element is fed with a signal through the feeding element to generate at least one resonant mode, and the radiating element is coupled to the slot to excite at least another one resonant mode.

* * * * *